(12) United States Patent
Iwaguchi

(10) Patent No.: US 6,441,306 B1
(45) Date of Patent: Aug. 27, 2002

(54) TUBE-CONNECTOR

(76) Inventor: Yasutada Iwaguchi, 1-9-11, Nakayamadai, Takarazuka-shi, Hyogo (JP)

( * ) Notice: Subject to any disclaimer, the term of this patent is extended or adjusted under 35 U.S.C. 154(b) by 0 days.

(21) Appl. No.: 09/899,048

(22) Filed: Jul. 5, 2001

(30) Foreign Application Priority Data

May 10, 2001 (JP) .......................................... 2001-139953

(51) Int. Cl.7 ............................. H02G 3/18; F16L 13/12
(52) U.S. Cl. .................... 174/65 R; 174/65 G; 138/177
(58) Field of Search .............................. 174/65 R, 65 G, 174/68.1, 68.3, 152 G, 152 R, 153 G, 135, 21 R, 22 R, 24, 72 R, 25 R, 95, DIG. 8, 73.1, 77 R, 84 R; D13/153; 138/177, 103, DIG. 11; 285/423, 18, 20, 155.1, 333

(56) References Cited

U.S. PATENT DOCUMENTS

| | | | | |
|---|---|---|---|---|
| 3,920,268 A | * | 11/1975 | Stewing | 285/423 |
| 4,002,818 A | * | 1/1977 | Kunze | 174/77 R |
| 4,479,031 A | * | 10/1984 | Ishise et al. | 174/73.1 |
| 4,586,970 A | * | 5/1986 | Ishise et al. | 174/DIG. 8 |
| 4,678,866 A | * | 7/1987 | Charlebois | 174/84 R |
| 4,915,990 A | * | 4/1990 | Chang | 138/177 |
| 5,070,597 A | * | 12/1991 | Holt et al. | 138/103 |
| 5,073,620 A | * | 12/1991 | Sanada et al. | 525/132 |
| 5,470,622 A | * | 11/1995 | Rinde et al. | 174/DIG. 8 |
| 5,832,158 A | * | 11/1998 | Chen | 385/53 |
| 5,986,042 A | * | 11/1999 | Irizato et al. | 528/322 |
| 6,053,639 A | * | 4/2000 | Chen | 385/53 |
| 6,056,018 A | * | 5/2000 | Renaud | 138/121 |
| 6,124,393 A | * | 9/2000 | Haraguchi et al. | 523/149 |

* cited by examiner

Primary Examiner—Dean A. Reichard
Assistant Examiner—Angel R. Estrada
(74) Attorney, Agent, or Firm—Moonray Kojima

(57) ABSTRACT

The present invention relates to the tube-connector made of a synthetic resin or rubber for connecting the tubes, which protect the electric wires or cables buried under the earth, wherein on the surface facing the tubes in the connecting part to connect the end part of the tubes after being inserted therein, there is formed an expanding body which swells absorbing water, thus providing for a very easy connecting operation and also water-proof properties.

7 Claims, 5 Drawing Sheets

TUBE-CONNECTOR

BACKGROUND OF THE INVENTION

1. Field of the Invention

The present Invention relates to the connector for connecting the tubes, which are used to protect the electric wires or cables and so on.

2. Description of the Prior Art

The tubes are buried under the earth with the necessary water-proof properties, wherein, as shown in the FIG. 5, there must be a strict water-proof between the tube-connector and the tube. The FIG. 5 shows the connector for connecting the tubes of various types 101 made of synthetic rubber, wherein the tube 102 provided with waves of synthetic resin having a protruding device 102a in the shape of a spiral around the tube is to be screwed onto one part of the tube-connector 101. Subsequently, the tube 103 which does not have a protruding device around it is inserted into another part of the tube-connector 101, which connector is tightened by the band 104. Consequently, the sealing tape 105 is tightly rolled around on the side of the tube 102 with waves, of the tube-connector 101, above which the water-tight protection tape 106 is firmly rolled and furthermore, the end of the water-tight protection tape 106, which has been rolled, is to be rolled while being pressed, using the vinyl tape 107. For the use in the exposed place, the vinyl tape 107 should be rolled on the whole part of the tube-connector 101.

Therefore, between the tube with waves 102 and the tube-connector 101, at least three-fold water-proof must be applied because of its shape, thus involving a lot of troubles for the connecting operation.

The example shown in the figure is a connector for connecting various tubes, wherein the above-described water-proof structure must be applied onto one end part, however in the case of the straight tube-connector there must be formed water-proof structures on both ends, the water-proof having to be done in a plurality of points depending on the types of the tube-connectors, thus involving more troubles and time.

SUMMARY OF THE INVENTION

The main purpose of the present invention is to provide a tube-connector, which enables a connecting operation to be done very easily, wherein the water-proof properties are very good.

In other words, a tube-connector of synthetic resin and rubber having a connecting part for connecting by inserting the end part of the tube must be provided, wherein the tube-connector comprises the expanding body which expands absorbing water, on the surface facing the tube in the above said connecting part.

The above-mentioned expanding bodies may be formed of water-swelling rubber or high water-absorbing resin (water-swelling polymer), for example, comprising fibers, powders and films in the shape of a metal. In the formation of the synthetic resin or rubber, pressure and heat may be applied, preferably comprising the flexible materials capable of being increased and decreased in terms of volume, being made of suitable heat resistant materials, for example, there may be used sponge materials or non woven cloths, containing or mixed with high water-absorbing resin or water-swelling rubber.

This means, in order to connect the tubes using the above described tube-connector, the end part of the tubes has only to be screwed, pressed or inserted into the connecting part of the tube-connector suitably according to their shapes. Afterwards, the expanding bodies formed on the facing surface of the connecting part become swollen with water, which water has come from outside, thus providing air-tightness, being pressed onto the surface of the tube bodies.

Therefore, it is not necessary to carry out the complicated operations like rolling various types of tapes there as conventionally has been done, providing for easy connecting operations so that the prompt connecting operation can be expected. Furthermore, when water is absorbed, the expanding body becomes expanded to be large, thus it is possible to obtain air-tightness surely while there is a good water-proof property. In addition, the expansion is done automatically, the process is very easy without any need of force like tightening.

Furthermore, when the expanding body comprises high water-absorbing resin, once it is expanded by water absorption, it is made hard to remove water even when adding pressure, and as there is water under the earth where the tubes are buried, air-tightness can be surely maintained.

As there is formed an expanding body, there is no need to have other parts to obtain water-proof and it is easy to control, for example, the products and operations are easy as described above.

A thermoplastic resin may be added into the expanding body, which resin can be melted by heat at the time of forming the expanding body. For example, by mixing into the expanding body made of non woven cloth as a fiber in an appropriate proportion, the thermoplastic resin may be melted at the time of formation and subsequently cooled and set so that there can be more unity with the forming material and its shape will be adjusted to any complicated form such as the one having threads of the screw. This enables sure insertion into the connecting part, while obtaining the effects of making the even expansion possible.

The sheet material may be inserted between the above described expanding body and the forming material. The sheet material may be ventilated like cloths or may be a film, which cannot be ventilated but may be the one that gets united with the forming material upon melting at the time of formation. At this time, on the surface of the sheet in contact with the expanding body there is applied an adhesive agent, thus suitably providing for the unity with the expanding body.

For instance, when the non woven cloth is used to form the expanding body, the material is liable to penetrate the expanding body at the time formation and also the expanding body tends to be carried away by the pressure at the time of formation wherein the sheet material deters the penetration of the material, thus providing for the suitable protection of the expanding body while serving as a buffer. Therefore, there can be obtained the effects of unifying the devices in such a state that the layer structure is conserved wherein a high water-absorbing resin of the expanding body can be swollen.

Other objects of the present invention will be easily clarified according to the below mentioned examples.

EXAMPLES

One preferred embodiment of the present invention will be explained according to the below figures.

Figure 1:
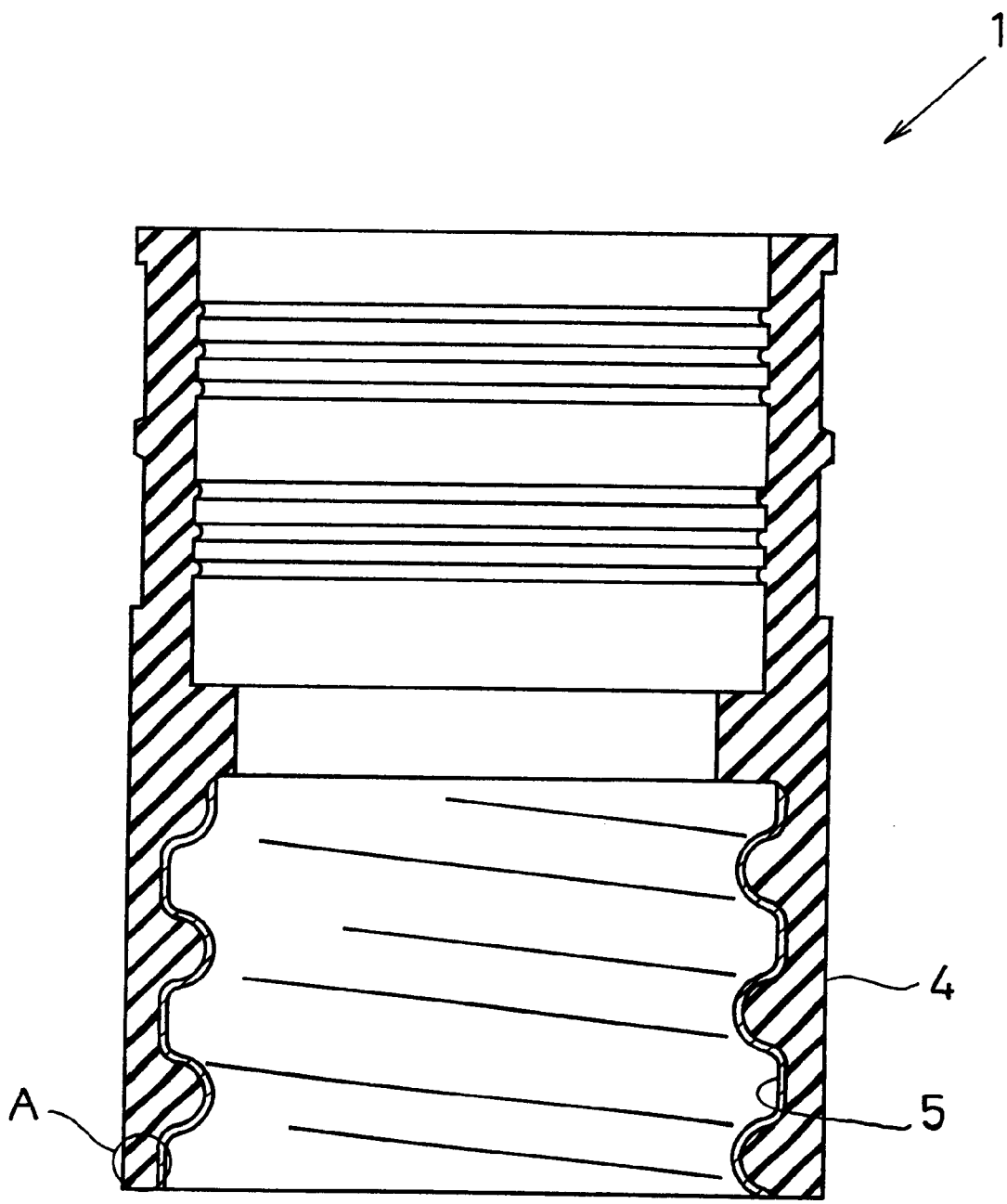
FIG. 1 is a cross section view of the tube-connector.

The FIG. 1 shows the cross section view of the tube-connector 1, wherein the tube-connector of the present invention is used to connect the tube 2 with waves of synthetic resin having the protruding device 2a in the shape of a spiral as a tube and the tube 3 of the synthetic resin without a protruding device, the tube-connector comprising rubber. The tube-connector may be formed of synthetic rubber or natural rubber or alternatively rubber mixed with the synthetic rubber and natural rubber. Furthermore, in the inner surface of the connecting part 4 for connecting the tube 2 provided with the above described waves of synthetic resin, there is formed the expanding body 5, which expands by absorbing water.

The expanding body 5 is formed of the compound of non-woven cloths, high water-absorbing resin and thermoplastic resin. This will be heated to the high temperature at the time of formation, as for the above described non-woven cloths, fibers of, for example, polyethylene terephthalate (PET) will be used because they are suitably heat-resistant. On the other hand, for the high water-absorbing resin, fibers, powers and sheets may be used in their suitable forms. As for the high water-absorbing resin, fibers may be mixed into non-woven cloths when they are used, thus providing for the expanding body to be expanded, but powders also may be mixed into the non-woven cloth fibers. When the high water-absorbing resin is used in the shape of a sheet, this may be sandwiched between non-woven cloths. The above-described thermoplastic resin may be formed of such a material as to be melted at the time formation and the said resin may be mixed therein in an appropriated proportion, for instance, as a fiber. The mixture proportion of non-woven cloths, a high water-absorbing resin and thermoplastic resin is such that the ratio of, for instance, the non-woven cloth and a high water-absorbing resin may be approximately 5:5 or 5:3 and the thermoplastic resin may sufficiently be a little.

For the manufacture of the tube-connector 1, the above-described expanding body 5 in the shape of a sheet is rolled onto the determined position of the mould (not shown in the figure), and the sheet material 6 will be additionally rolled in order to prevent the synthetic rubber as a forming material from getting into the expanding body 5 made of non-woven cloths. As for the sheet material 6 as described above, a cotton cloth may be used, wherein, on one side there may be used an adhesive agent 7, for instance, rubber glue may be used, thus allowing for unity with the expanding body 5.

Figure 2:
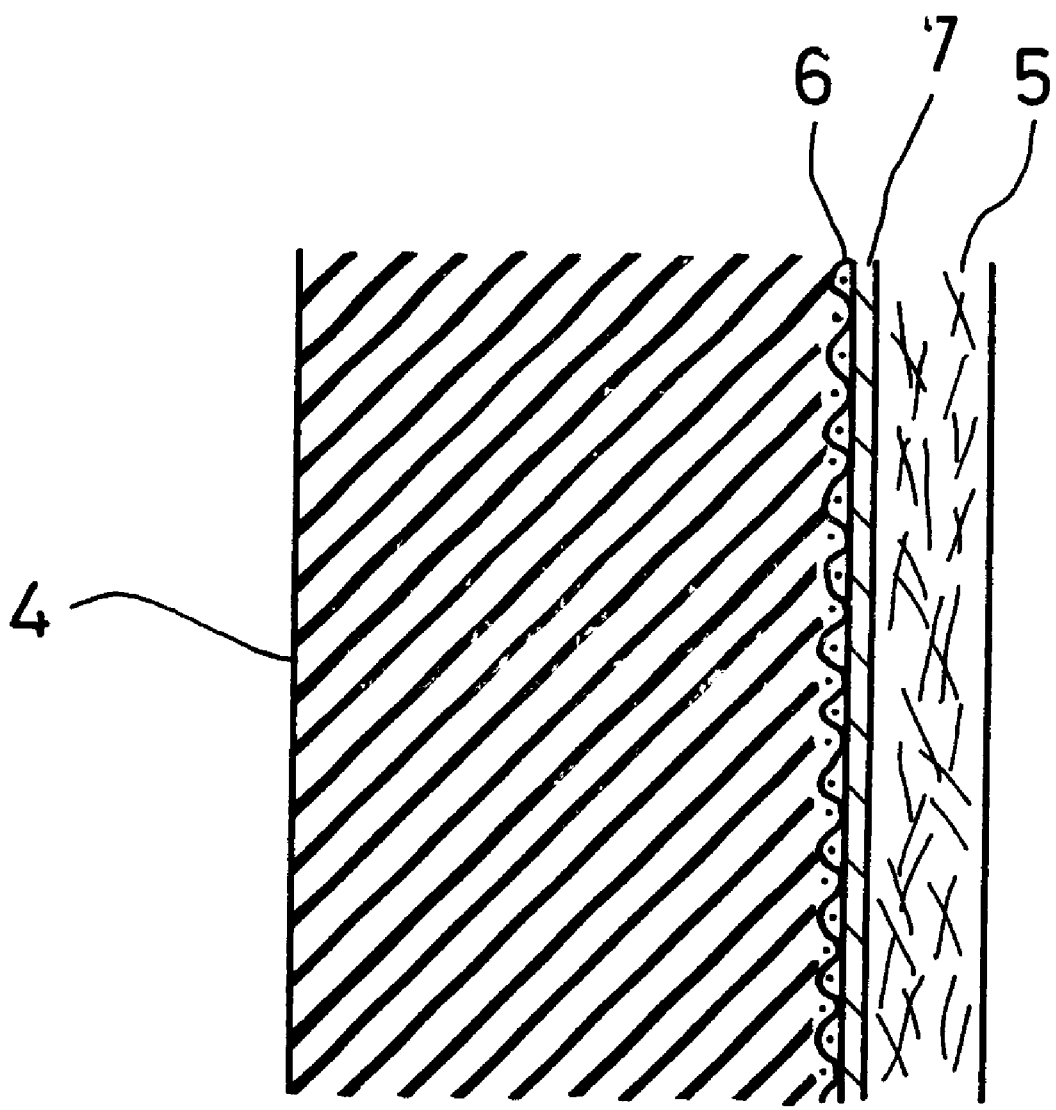
FIG. 2 is a magnified view of A part in the FIG. 1.

Upon the formation of the above said tube-conductor, the above described sheet material 6 prevents the synthetic rubber from getting into the expanding body 5 made of a non-woven cloth, the sheet material serving as a buffer, as shown in the FIG. 2, while assuring the layer of the expanding body 5 by alleviating the pressure put at the time of the formation. In addition, as the thermoplastic resin inside the expanding body 5 is melted, there is an increasing unity with the forming material, thus providing for a stable fitness in respect of the shapes even when having threads of screws, for instance. For this reason, there can be assured an inserting effect into the connecting part, wherein sure water-proof effects can be obtained, allowing for an even expansion.

Alternatively, when the forming pressure can be lowered, the above said sheet material 6 may be omitted.

Figure 3:
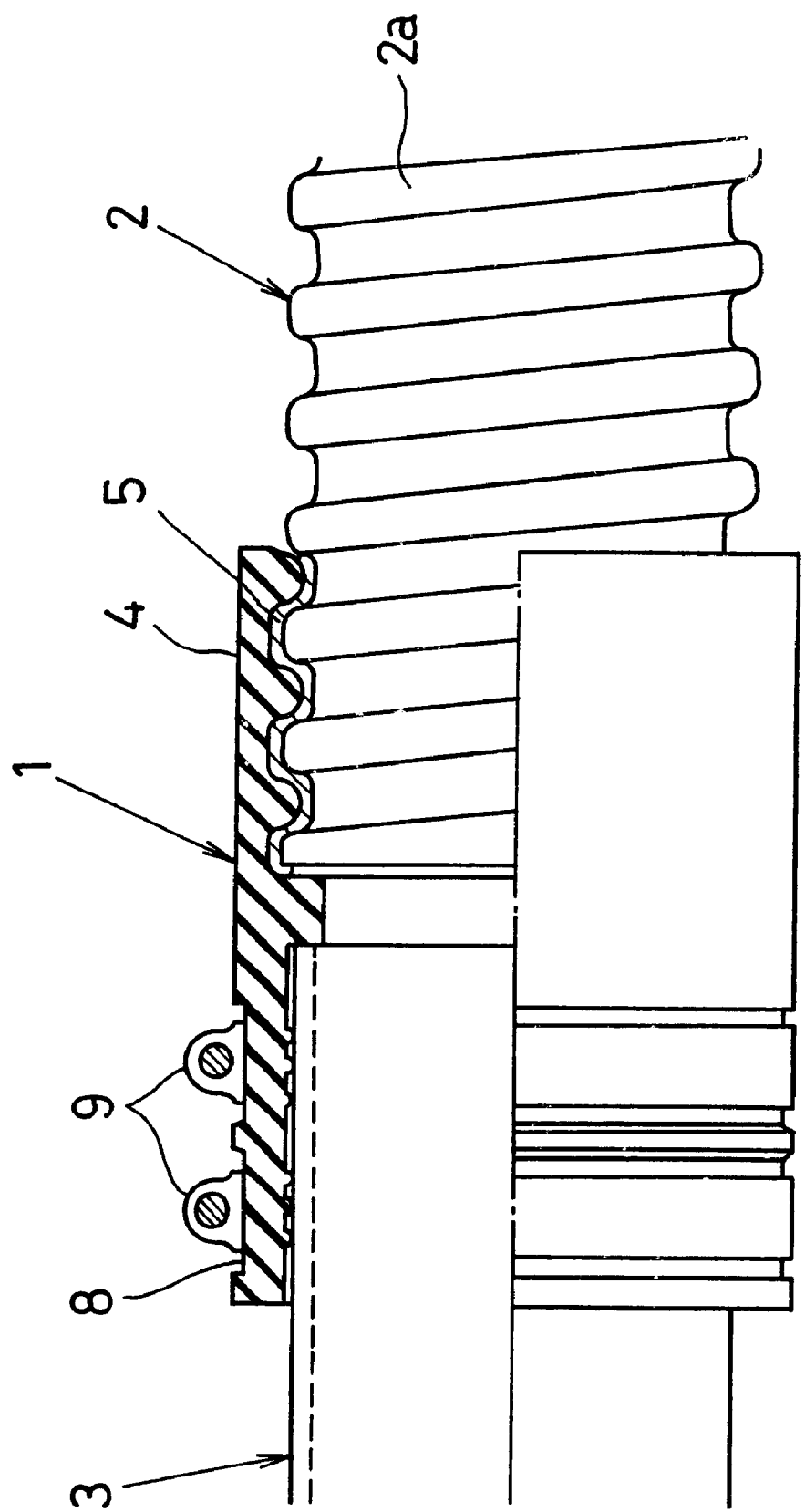
FIG. 3 is a partial cross section view of the device being used.

The tube-connector 1 thus constructed may only have to be connected by inserting the tube 2 with waves of synthetic resin into the connecting part 4. When buried under the earth, the expanding body 5 swells with water inside the earth as shown in the FIG. 3, thus obtaining water-proof.

Inserting the tube 3 of synthetic resin into the other connecting part 8, it is possible to obtain water-proof by tightening with the band 9.

Figure 4:
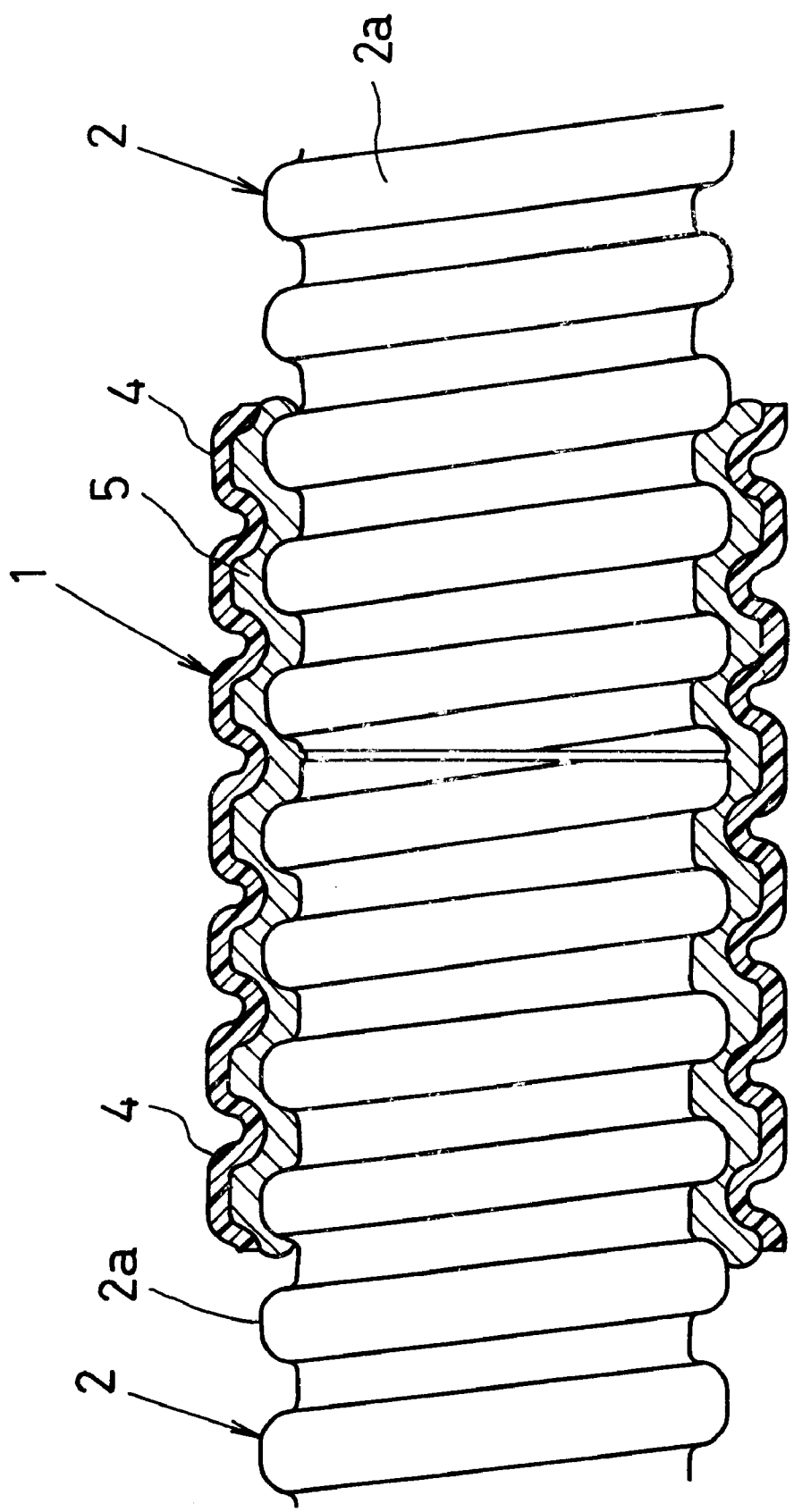
FIG. 4 is a cross section view of the tube-connector being used according to other examples.
Figure 5:
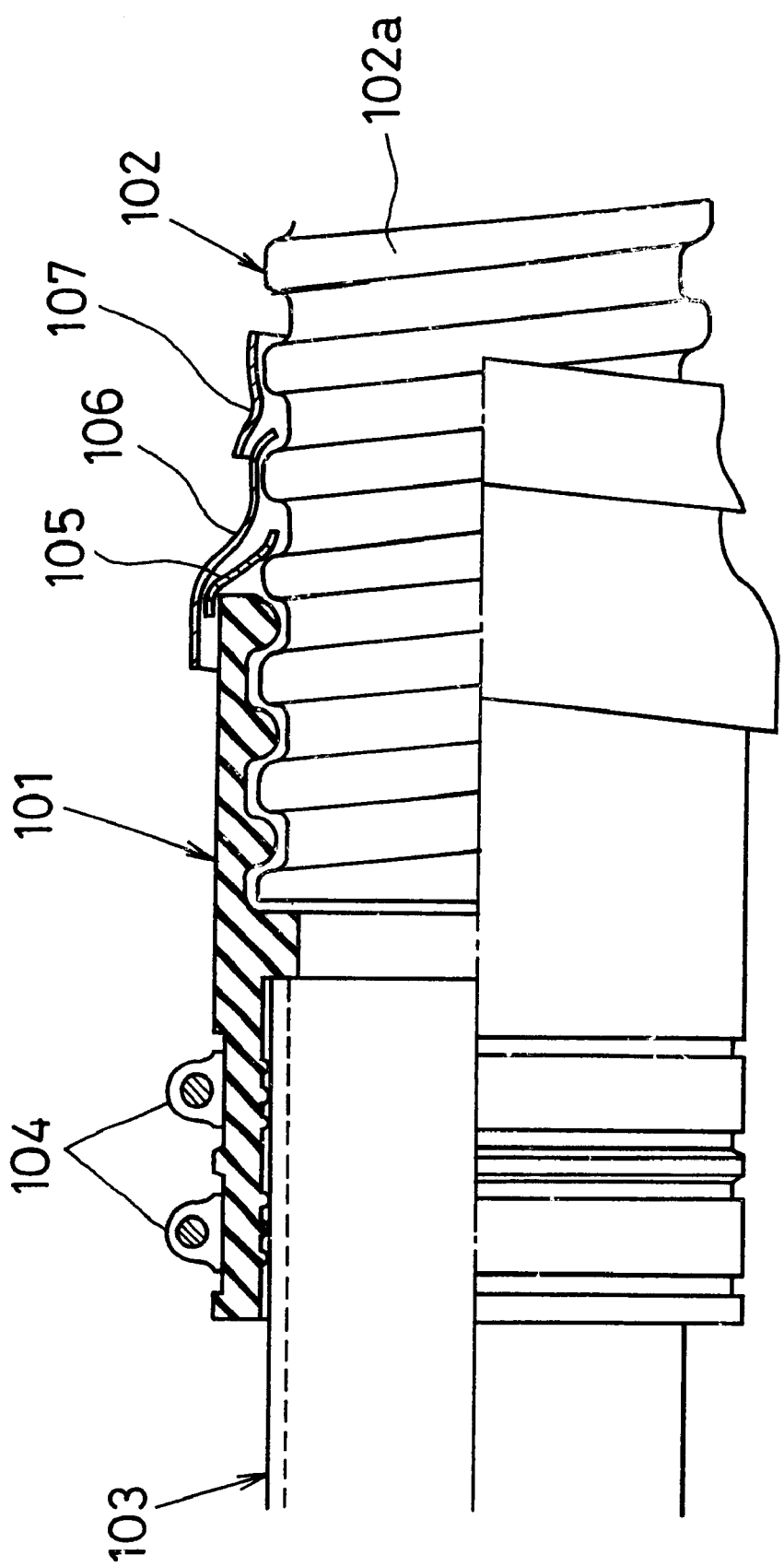
FIG. 5 is a partial cross section view of the prior art.

The FIG. 4 shows the tube-connector 1 of the synthetic resin formed in the shape of a cylinder having a protruding device in the shape of a spiral in the inner surface, in order to connect both tubes 2,2 with waves of synthetic resin. Additionally, there is formed the expanding body 5 as described above, in the whole part of the inner surface of the connecting part 4, facing the tube 2 on both sides of the tube-connector 1 of the present invention.

As one example of the above description, with the tube-connector 1 there is formed the expanding body 5 in the connecting part 4 for connecting the tube 2 with waves of synthetic resin, while there may also be formed the expanding body 5 in the connecting part for connecting the tube without a protruding device. Alternatively, the tube-connector 1 may be used not only in a way that the tube is inserted into its inner part but also it may be so constructed that the tube is inserted onto the outer part of the tube connector. In this case, the outer surface of the connecting part corresponds to the facing surface of the tube connector in the scope of the claims involving the present invention.

In this way, the connecting operation is very easy, as it suffices to insert the tube into the connecting part upon screwing. Additionally, as the expanding body swells to press against the outer surface of the tube, high water-proof properties can be automatically obtained even without applying forces like tightening with screws or rolling with tapes.

What is claimed is:

1. A tube connector comprising:

a connecting structure made of synthetic resin or rubber for interconnecting ends of a pair of tubes, said structure having a wave-like surface facing a surface of said tubes at areas of interconnection; and an expanding body disposed on said wave-like surface of said structure facing a surface of said tubes at areas of interconnection, wherein said expanding body is caused to expand by absorbing water thereby to create a tight connection between the two tubes.

2. The connector of claim 1, wherein said expanding body comprises a non-woven cloth having a high water absorbing resin.

3. The connector of claim 1, wherein said expanding body comprises a thermoplastic resin.

4. The connector of claim 2, wherein said expanding body comprises a thermoplastic resin mixed thereinto.

5. The connector of claim 1, further comprising a sheet material disposed adjacent to said expanding body, and a forming layer disposed thereagainst, wherein said sheet material prevents said forming layer from penetrating into said expanding body.

6. The connector of claim 2, further comprising a sheet material disposed adjacent to said expanding body, and a forming layer disposed thereagainst, wherein said sheet material prevents said forming layer from penetrating into said expanding body.

7. The connector of claim 3, further comprising a sheet material disposed adjacent to said expanding body, and a forming layer disposed thereagainst, wherein said sheet material prevents said forming layer from penetrating into said expanding body.

* * * * *